(12) United States Patent
Flore et al.

(10) Patent No.: US 6,441,784 B1
(45) Date of Patent: Aug. 27, 2002

(54) METHOD AND APPARATUS FOR UPLINK AND DOWNLINK WEIGHT PREDICTION IN ADAPTIVE ARRAY SYSTEMS

(75) Inventors: Oronzo Dino Flore; Paul Petrus, both of Santa Clara, CA (US)

(73) Assignee: ArrayComm, Inc., San Jose, CA (US)

( * ) Notice: Subject to any disclaimer, the term of this patent is extended or adjusted under 35 U.S.C. 154(b) by 10 days.

(21) Appl. No.: 09/608,835

(22) Filed: Jun. 30, 2000

(51) Int. Cl.[7] ................................................. H01Q 3/00
(52) U.S. Cl. ....................................................... 342/377
(58) Field of Search ................................ 342/368, 378, 342/383, 377; 455/562

(56) References Cited

U.S. PATENT DOCUMENTS 6,218,986 B1 * 4/2001 Yukitomo et al. ........... 342/372
6,232,921 B1 * 5/2001 Aiken et al. ................. 342/383

FOREIGN PATENT DOCUMENTS

WO    WO 97/27643   *  7/1997   ............. H01Q/3/26

OTHER PUBLICATIONS

Kishiyama, Y. et al. "Weight Estimation for Downlink Null Steering in a TDD/SDMA System", 2000 IEEE 51st Vehicular Technology Conference Proceedings VTC–2000, May 15–18, 2000, pp. 346–350 vol. 1.*

Hugl, Klaus et al, "Downlink Beamforming for Frequency Division Duplex Systems", Global Telecommunications Conf, GLOBALCOM '99, May 1999, pp. 2097–2101.*

* cited by examiner

Primary Examiner—Gregory C. Issing
(74) Attorney, Agent, or Firm—Blakely Sokoloff Taylor & Zafman, LLP

(57) ABSTRACT

A method and apparatus for predicting uplink and/or downlink beamforming in a wireless communication system employing an antenna array. The method and apparatus may predict uplink and/or downlink weights as a function of previous uplink and/or downlink weights. An interpolation of a sample of uplink weights and/or downlink weights is used to predict a future uplink or downlink weight.

21 Claims, 3 Drawing Sheets

METHOD AND APPARATUS FOR UPLINK AND DOWNLINK WEIGHT PREDICTION IN ADAPTIVE ARRAY SYSTEMS

FIELD OF THE INVENTION

The present invention relates to the field of wireless communications systems, and in particular, to a method and system for uplink and/or downlink prediction in wireless systems employing adaptive antenna arrays.

BACKGROUND OF THE INVENTION

Although antennas have sometimes been one of the neglected components of wireless systems, relatively recent developments in the field of (adaptive) antenna arrays and "smart antennas" have realized significant improvements in various aspects of wireless communication, such as frequency spectrum use, signal-to-noise ratio (SNR), interference reduction, directionality, spatial diversity, power efficiency, and security. Antenna arrays may be employed in a number of different wireless applications, including, but not limited to, radio communication systems, cellular systems, television broadcasting, point to point systems, paging systems, medical applications, etc).

Antenna arrays typically include a number of antennas that are spatially separated and coupled to one or more processors. Adaptive antenna arrays, or simply, adaptive arrays, periodically analyze the signals received from each of the antennas in an array to distinguish between desired signals (e.g., from a desired source, such as cellular telephone or other communication device) and undesired signals (e.g., interference sources), multipath, etc. The process of combining the signals from a number of antenna elements to enhance the gain toward a desired source is sometimes referred to as beamforming.

The use of a number of spatially separated antennas allows adaptive array systems to transmit and receive signals in a spatially (and/or temporally) selective manner. As such, adaptive arrays perform beamforming in such a way as to enhance their transmit (downlink) and receive (uplink) energy "toward" a "desired" source, while diminishing transmit and receive energy toward interfering sources. Because adaptive array systems may distinguish between spatially distinct sources (e.g., two cellular user units separated in space), such systems are sometimes referred to as "spatial processing" or "spatial division multiple access (SDMA)" systems. Such systems generally provide improved performance relative to single antenna element systems.

FIG. 1 is a diagram depicting a simplified radiation pattern of an antenna array system. As shown, in accordance with known techniques, an antenna array 10 transmits and/or receives signals with a desired source 12, representing a remote user terminal, (e.g., a mobile or stationary communicator, a modem, or other wireless communication device) by generating an enhanced gain region 18, representing a relatively enhanced radiation gain pattern for the antenna array 10. The enhanced gain region 18 is directed toward, or more generally, associated with, the desired source 12 for transferring signals between the antenna array 10 and the desired source 12.

On the other hand, the antenna array 10 generates an interference mitigated region 16, sometimes referred to as a "null" region, directed toward an interfering source 14 (which may be another remote terminal or environmental interference source, such as a moving vehicle). Contrary to the enhanced gain region 18, the interference mitigated or null region 16 represents a region of relatively minimal radiation gain.

It should be appreciated that the interference mitigated region 16 may often include some level of gain, though typically less than the enhanced gain region 18. Ideally, an antenna array would generate a null to direct zero gain toward an interfering source. Furthermore, it should be appreciated that FIG. 1 shows a simplified depiction of a radiation pattern of only one type of antenna array system. Therefore, the discussion herein is not limited to any one type of antenna array or spatial processing technique or radiation pattern or beamforming technique, or a particular wireless system or application.

Typically, the antenna array 10, during uplink communications (i.e., communications transmitted by the desired source to the antenna array), applies an amplitude and phase adjustment to each uplink signal received at each array element to enhance (uplink) gain toward the desired source (s)—in this case, the desired source 12—while minimizing undesired signals and noise—e.g., the interfering signals associated with the interfering source 14. By taking into consideration the amplitude and phase adjustments for all of the array elements, the antenna array 10 may compute an uplink "weight," which may be a vector or matrix, the latter of which may have spatial and/or temporal components. In turn, the uplink weight determines the energy pattern for the antenna array 10 during uplink.

On the other hand, during downlink transmission (i.e., transmission from the antenna array to the desired source), the antenna array 10 may use the previous uplink weight (along with adjustments for calibration) for downlink beamforming. Ideally, a downlink weight allows an antenna array to enhance the transmission gain in the direction of the desired user, while minimizing the transmission gain in the direction of interferers, and an uplink weight allows an antenna array to enhance the reception gain in the direction of the desired user, while minimizing the reception gain in the direction of interferers.

Subsequent to uplink beamforming, the antenna array 10 typically will transmit to the desired source 12 (and mitigate interfering sources) in accordance with essentially the same weight computed for previous uplink signals. In other words, the gain pattern for the uplink signal(s) is utilized for, and thus, is mirrored by the next downlink gain pattern. Expressed in terms of the uplink weight used to derive the uplink beamform, the uplink weight at time k, represented by $W^U_k$ is mirrored by the downlink weight at time k+t, such that $W^U_k = W^U_{k+t}$. In some applications, the uplink and downlink weights may not be identical, for example, due to calibration, as described, for example, in U.S. Pat. No. 6,037,898, entitled, "Method and Apparatus for Calibrating Radio Frequency Base Stations Using Antenna Arrays," issued Mar. 14, 2000 and assigned to the assignee of the present invention.

Although the method and system shown in FIG. 1 may provide sufficient performance in applications where the desired source 12 and the interfering source 14 are stationary or there are relatively few other interfering sources (e.g., moving cars, other communicating devices, etc.) or the number of total user terminals is relatively small, undesired results may occur in mobile environments. For example, in a cellular environment, where the antenna array 10 may be part of a basestation, the desired source 12 may be a mobile unit (e.g., a cellular phone) that is in motion, as may be one or more other interfering sources, using a downlink weight that merely mirrors the previous uplink weight may result in interference or other undesirable performance losses.

At least one reason for such performance loss is the time interval between uplink and downlink transmissions in some systems, for example, time division duplex (TDD) systems. Because signal sources, both desired and interfering, may be in motion and thus change their spatial location in such time interval, using a downlink that essentially mirrors a previous uplink may provide unsatisfactory performance. For instance, in the diagram shown in FIG. 1, if the desired and interfering sources are in close proximity and moving toward each other, the desired source may move closer to the interference mitigated region 16, while the interfering source may move closer to the enhanced gain region 18. As such, not only may the enhanced or maximized signal gain not be directed accurately toward a desired source, but also interference mitigated regions may not be directed to interfering sources, due to the motion.

Thus, what is desired is a method and system that overcomes the above-described limitations associated with uplink and downlink beamforming, especially in mobile environments.

SUMMARY OF THE INVENTION

A method and apparatus for predicting information for uplink and downlink beamforming in a wireless communication system employing an antenna array is provided. According to one aspect of the invention, a method and apparatus to predict uplink and/or downlink weights as a function of previous weights is provided. A sample of uplink weights and/or downlink weights are used to predict a future uplink or downlink weight.

DETAILED DESCRIPTION

The present invention provides a method and apparatus for predicting an uplink and/or a downlink weight for determining a corresponding uplink and/or downlink beamforming strategy, respectively, based on the behavior and relative variance of a sample of previous uplink and/or downlink weights. According to one aspect of the present invention, a method and system is provided tracking the motion of one or more signal sources (e.g., a desired source, such as a remote user terminal) in communication with an antenna array.

In one embodiment, the antenna array may be part of a cellular basestation and the mobile unit may represent a cellular phone. However, it should be appreciated that the present invention is not limited to any particular type of wireless application, including cellular systems, but may be utilized in various types of wireless systems and applications employing antenna arrays. The invention is especially useful in spatial division multiple access systems (SDMA) or other types of systems wherein adaptive arrays may be employed. For example, the invention may be utilized in time division duplex (TDD) or frequency division duplex (FDD) communication systems and/or in conjunction with other wireless communication architectures. Furthermore, each or a combination of the various elements of the invention may be implemented in hardware, software, or a combination thereof.

Figure 1:
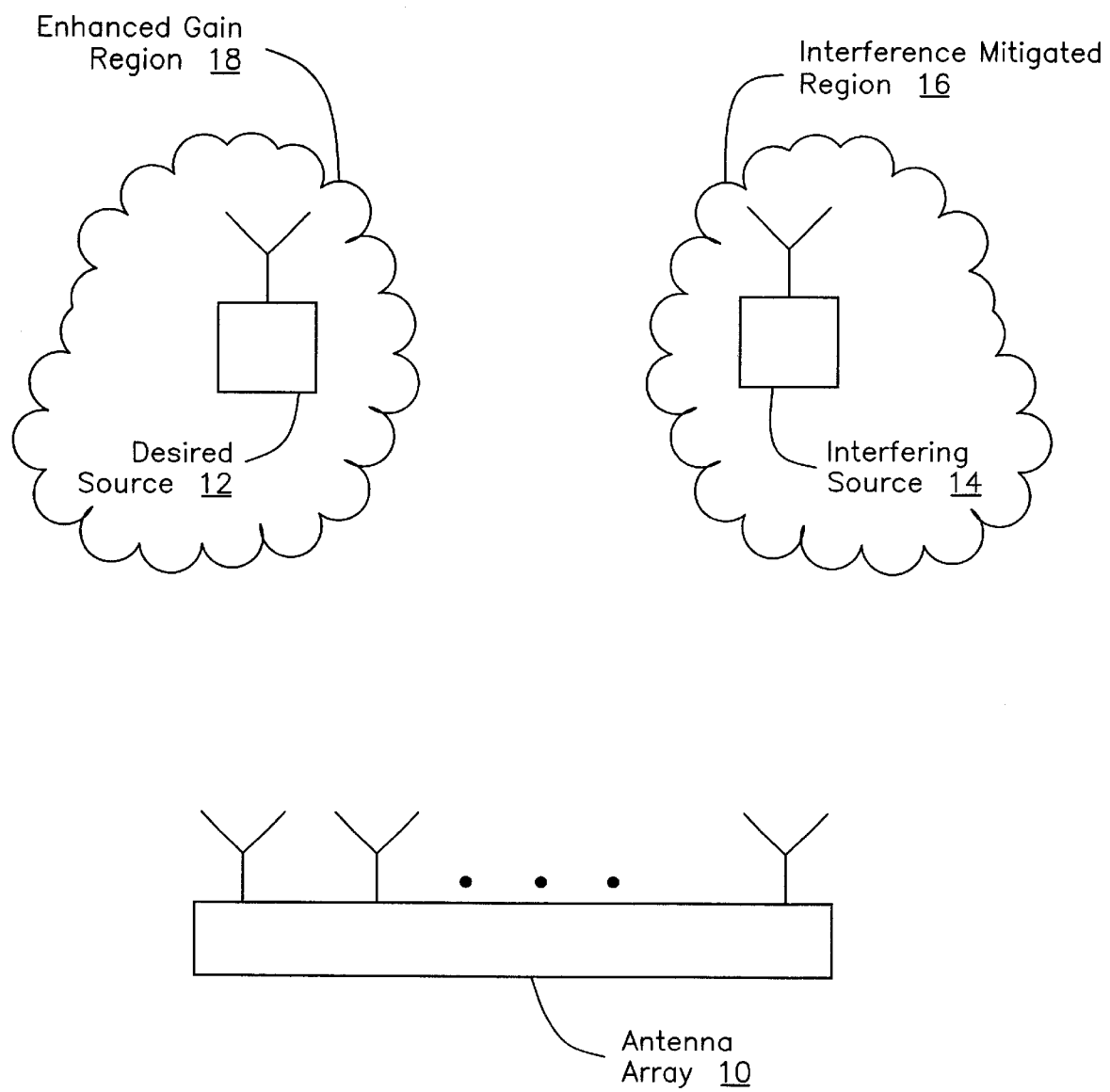
FIG. 1 is a diagram depicting a simplified radiation pattern of an antenna array system.
Figure 2:
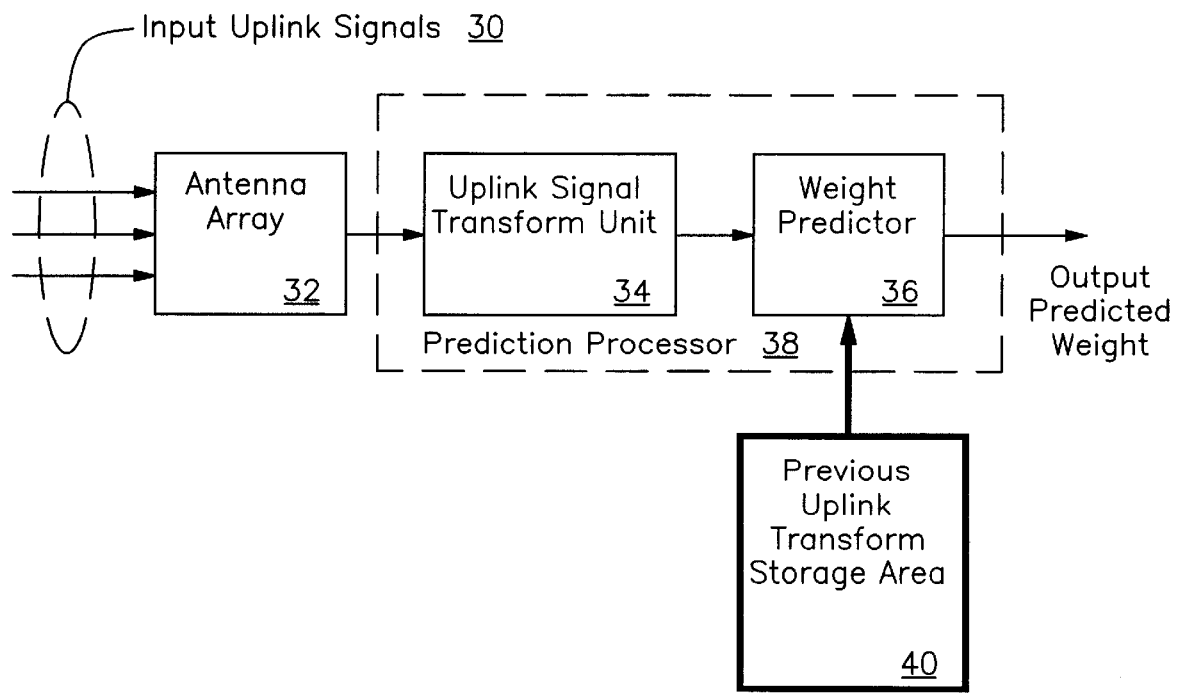
FIG. 2 is a block diagram of a downlink weight prediction system, according to one embodiment of the invention.

FIG. 2 is a block diagram of a downlink weight prediction system, according to one embodiment of the invention. As shown in FIG. 2, a set of uplink signals 30 is input to an antenna array 32. Each of the uplink signals 30 may represent, for example, signals transmitted from a mobile cellular phone or other mobile wireless transmitter/receiver device and received by the antenna array 32. The antenna array 32 typically includes a plurality of antenna elements.

The set of uplink signals 30 received by the antenna array 32 are provided to an uplink signal transform unit 34. The uplink signal transform unit 34, in one embodiment, includes processing circuitry to perform transform operations on the "raw" uplink signals received by the array 32. In accordance with one embodiment of the invention, the uplink signal transform unit 34 processes the set of uplink signals 30 to generate an uplink and/or a downlink weight, which in turn is used by a downlink weight predictor 36, also coupled to a storage area 40 that stores previous uplink transforms (e.g., previous uplink weights), to predict a future uplink and/or downlink weight. As shown, the uplink signal transform unit 34 and the downlink weight predictor 36 constitute a prediction processor 38.

Figure 3:
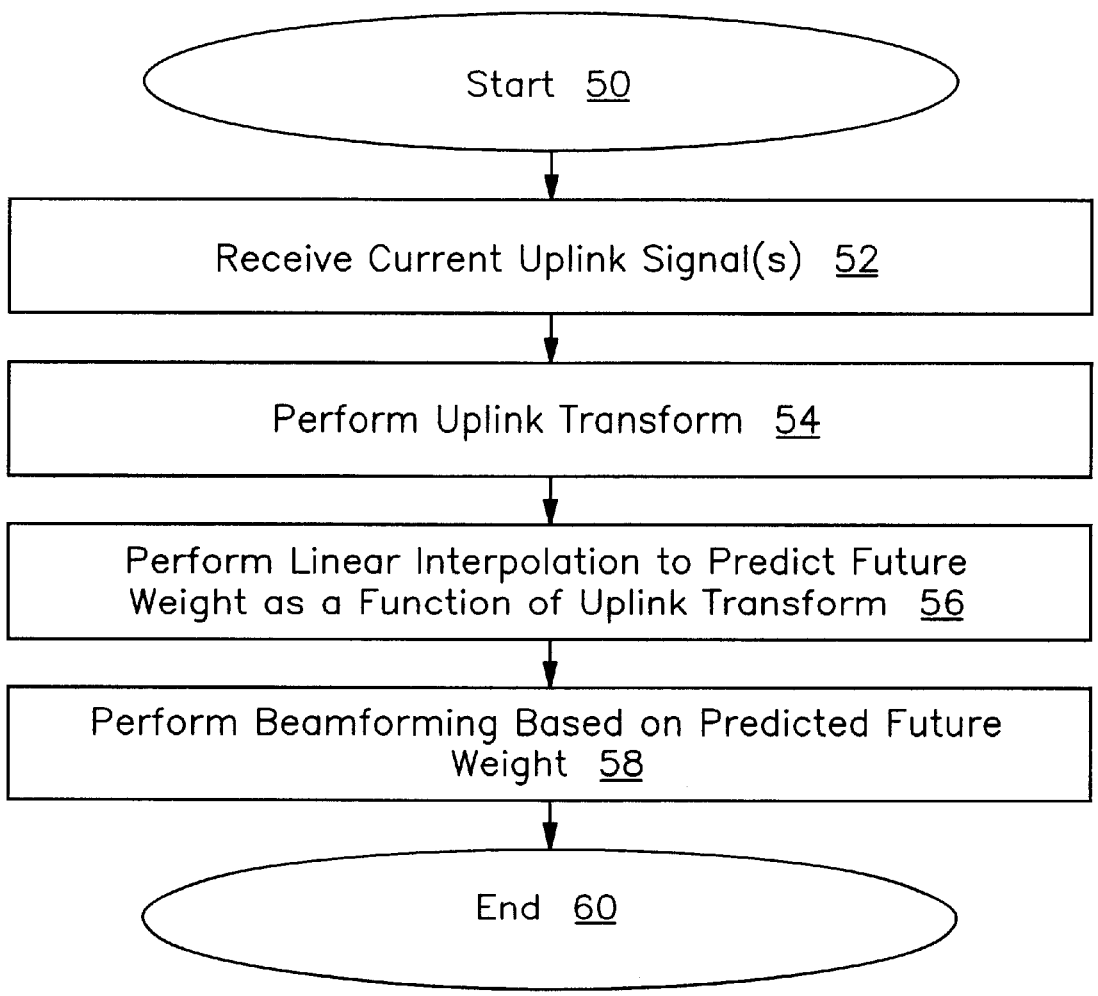
FIG. 3 is a block diagram of a prediction processor, according to one embodiment of the invention.

FIG. 3 is a flow diagram illustrating a method for weight prediction, according to one embodiment of the invention. In FIG. 3, flow begins at block 50 and ends at block 60. To aid in the understanding of the invention, FIG. 3 is described with reference to one embodiment of the invention in which a future downlink weight is predicted as a function of previous uplink weights (e.g., a current uplink weight and at least one previous uplink weight). However, it will be appreciated that in alternative embodiments, a future downlink weight may be predicted as a function of previous downlink weights and/or previous uplink weights, or a future uplink weight may be predicted as a function of previous uplink and/or previous downlink weights.

At block 52, a set of current uplink signals are received. In one embodiment of the invention, the set of uplink signals may include signals received by an antenna array from a desired source and one or more interfering sources.

At block 54, an uplink transform is performed to produce an uplink transform. In one embodiment, the uplink transform represents a current uplink weight, which is a vector.

At block 56, the uplink transform, for example, the current uplink weight, is used to predict a future uplink or downlink weight. A weight for time instant k may be predicted as a linear combination or interpolation of L previous weights, such that:

$$\hat{w}(k)=a_1 w(k-1)+\ldots+a_L w(k-L) \qquad (1)$$

where the $a_i$'s, the linear prediction coefficients, are M×M matrices, and M is the number of antennas in the antenna array.

If a matrix $A_L=[a_1 \ldots a_L]$, and a matrix $W_L(k-1)=[w(k-1)^T \ldots w(k-L)^T]^T$, where T denotes the matrix transpose, then equation (1) above may be expressed in matrix form as follows:

$$\hat{w}(k)=A_L W_L(k-1)$$

The prediction error may be expressed as follows:

$$\tilde{w}(k)=w(k)-\hat{w}(k)=[I_m - A_L]W_{L+1}(k)$$

and the M×M prediction error variance may be expressed as follows:

$$E(\tilde{w}(k)\tilde{w}^\dagger(k))=[I_m - A_L]R_{L+1}{}^w[I_m A_L]^\dagger$$

where $R_L{}^w = E(W_L(k)W_L{}^{\dagger(k)})$, "†" denotes a transpose complex conjugate, and $I_m$ is the unitary matrix of the order M.

The minimization of the prediction error variance is determined, in one embodiment of the invention, as follows:

$$\min_{A_L}[I_m - A_L]R_{L+1}^w[I_m - A_L]^\dagger = \sigma_{\tilde{w},L}^2. \quad (2)$$

The solution to equation (2) is provided by:

$$[I_m - A_L]R_{L+1}{}^w = [\sigma_{\tilde{w},L}^2 0 \ldots 0], \quad (3)$$

which are the normal equations. By partitioning $R_{L+1}{}^w$, equation (3) can be expressed as:

$$[I_m - A_L]\begin{bmatrix} r_0 & r \\ r^\dagger & R_L^w \end{bmatrix} = [\sigma_{\tilde{w},L}^2 0 \ldots 0], \quad (4)$$

where $r_0 = E(w_L(k)w^\dagger(k))$ and $r = E(w_L(k)W_L^\dagger(k-1))$.

Finally, from equation (4), it follows that:

$$\begin{cases} \sigma_{\tilde{w},L}^2 = r_0 - r(R_L^w)^{-1}r^\dagger \\ A_L = r(R_L^w)^{-1} \end{cases} \quad (5)$$

At block 56, the predicted future uplink or downlink weight is determined, in one embodiment, by estimating $R_L^w$ and r, which are referred to as autocorrelation matrices. In one embodiment, a block-based estimation (i.e., for a block of weights, for example, each corresponding to a burst of information) is performed to estimate the autocorrelation matrices $R_L^w$ and r, such that:

$$\hat{R}_L^w = \frac{1}{N}\sum_{i=1}^N W_L(i)W_L^\dagger(i) \text{ and } \hat{r} = \frac{1}{N}\sum_{i=1}^N w(i+1)W_L^\dagger(i).$$

In one embodiment of the invention, these two quantities, $\hat{R}_L^w$ and r, are used to predict a future downlink weight as function of L previous uplink weights. In an alternative embodiment, a future downlink weight is predicted as a function of L previous downlink weights. Thus, it should be appreciated that the invention allows prediction of one or more future weights, uplink and/or downlink, as a function of the varying relative behavior of previous uplink and/or downlink weight samples.

In an alternative embodiment, a recursive, rather than block-based, estimation technique is utilized to estimate AL for a predicted future weight at time k, by $\hat{A}_{L,k} = \hat{r}_k(R_L^w)_k^{-1}$. The recursion for $(\hat{R}_L^w)_k^{-1}$ is given by the following for time k:

$$\hat{R}_{L,k}^w = \frac{1}{N}\sum_{i=1}^k \lambda^{k-i} W_L(i)W_L^\dagger(i) \quad (6)$$

where $\lambda^{k-i}$ is the exponential factor (also referred to as -a forgetting factor) with which previous samples are weighted. Equation (6) can also be expressed in the following recursive form:

$$\hat{R}_{L,k} = \lambda\hat{R}_{L,k-1} + W_L(k)W_L^\dagger \quad (7)$$

The following matrix inversion lemma is useful in the recursive method of one embodiment of the invention: If A and B are two positive M×M matrices, related by $A = B^{-1} + CD^{-1}C^\dagger$, where D is a positive N×M matrix, and C is a M×N matrix, then according to the matrix inversion lemma, the inverse of matrix A may be expressed as the following:

$$A^{-1} = B - BC(D + C^\dagger BC)^{-1}C^\dagger B$$

Using the matrix inversion lemma above, the recursive formula for the estimation of $(\hat{R}_k^{-1})$ may be expressed as follows:

$$(\hat{R}_L^w)_k^{-1} = \lambda^{-1}(\hat{R}_L^w)_{k-1}^{-1} - \frac{\lambda^{-2}(\hat{R}_L^w)_{k-1}^{-1}W_L(k)W_L^\dagger(k)(\hat{R}_L^w)_{k-1}^{-1}}{1 + \lambda^{-1}W_L^\dagger(k)(\hat{R}_L^w)_{k-1}^{-1}W_L(k)}. \quad (8)$$

Similarly, r may be expressed as follows:

$$\hat{r}_k = \lambda\hat{r}_{k-1} + w(k)W_L^\dagger(k-1) \quad (9)$$

In one embodiment, the quantities in equations (8) and (9) above are initialized as follows:

$$(R_L^w)_0^{-1} = (W_L(L)W_L(L)^\dagger)^{-1} \text{ and } \hat{r}_0 = 0_{4\times(4L)}$$

Thus, in one embodiment of the invention utilizing the above-described recursive linear prediction, the weight vector $w_k$ is predicted for time k as $\hat{w}(k) = \hat{A}_{L,k-1}W_L(k-1)$, while $\hat{A}_{L,k} = \hat{r}_k(\hat{R}_L^w)_k^{-1}$ is updated by equations (8) and (9) above.

At block 58, beamforming is performed according to the predicted weight determined at block 56.

In one embodiment, the invention is implemented in a time-division duplex (TDD) system. In such systems, downlink transmissions (i.e., from the antenna array to user units) and uplink transmissions (i.e., from the user units to the antenna array) may occur at the same frequency, but at different times. For example, an uplink transmission may occur at time kT, a next (future) downlink at time kT+τ, where t is less than 1, and the next (future) uplink at time kT+1, and so on, where k is a real number and T represents a time interval. For example, the invention, in one embodiment, may be implemented in a TDD system, such as the Personal Handyphone System (PHS), where there is a 2.5 ms time interval between successive uplink and downlink signals.

As such, in one embodiment of the invention, a future downlink weight, and in turn, beamforming strategy, may be predicted in a TDD system. According to one embodiment, at time k, the current uplink weight $w_{kT}{}^u$ may be determined. The next (future) uplink weight $\hat{w}_{kT+1}{}^u$ may be predicted as described above. Then, the next (future) downlink weight, $\hat{w}_{kT+\tau}{}^d$ may be determined by interpolating the current uplink weight $w_{kT}{}^u$ and the predicted future uplink weight $\hat{w}_{kT+1}{}^u$. For example, assuming an equal time interval between uplink and downlink transmissions (e.g., the 2.5 ms time interval in the PHS system), then $$\hat{w}_{kT+\tau}^d = \frac{w_{kT}^u + \hat{w}_{kT+1}^u}{2}.$$

In an alternative embodiment, the future downlink weight, $\hat{w}_{kT+\tau}{}^d$, may be predicted without predicting a future uplink weight.

In an alternative embodiment, the angle of arrival (AOA) of uplink signals are used to predict a downlink weight. Such an embodiment of the invention may be implemented in a Frequency Division Duplex (FDD) system or a TDD system. In this embodiment of the invention, the AOAs associated with the uplink signals are first computed. Any one or combination of known techniques for calculating AOAs of uplink signals may be used. Subsequently, a downlink weight is determined as a function of the AOAs. In one embodiment, the AOAs are predicted linearly (e.g., by determining the change in the AOAs as a function of time, and linearly interpolating to predict future AOAs based on the time-change of previous AOAs). In alternative embodiments, the AOAs may be predicted using other techniques.

In one embodiment, a future downlink weight is predicted as a function of the predicted AOAs, such that at time kT, $W^d_{kT+\tau} = f(AOA_{Predicted})$. In an alternative embodiment, a downlink weight at time kT is determined from the AOAs and is directly used to predict future downlink weights (i.e., as one downlink weight is determined based on a given set of AOAs, future downlink weights are linearly predicted from the determined downlink weight). In one embodiment, the prediction of downlink weights may be based on linear prediction and/or interpolation.

In an alternative embodiment, which may be implemented in a FDD or TDD system, a feedback channel is used by a remote user terminal to provide channel information to the antenna array. Such channel information, in turn, is used by a prediction processor coupled to the antenna array to determine a weight, and in one specific embodiment, a previous downlink weight. A sample of L previous downlink weights are used to predict a future downlink or future uplink weight. For example, the recursive or block techniques described with reference to FIG. 3 may facilitate prediction of the future weight based on two or more previous downlink weights.

It will be appreciated that each element of the invention may be implemented in hardware, software, or a combination thereof. For example, in one embodiment, a processor (e.g., a digital signal processor, general purpose microprocessor, FPGA, a combination thereof, etc.) that is configured to execute one or more routines may perform the processing of uplink signals and generation and prediction of weights. As such, in one embodiment, each of the blocks shown in FIGS. 2 and 3 may represent instruction modules executable by one or more data processing devices, and stored in a data storage area(s), such as read-only memory (ROM), hard disk, magnetic disk, random access memory (RAM), flash memory, optical drive, tape, a combination thereof, or other data storage medium or device. In alternative embodiments, one or more of the blocks may be implemented by hardware (e.g., circuitry) or a combination of hardware and software.

Although the invention has been described with reference to several embodiments, it will be appreciated that various alterations and modifications may be possible without departing from the spirit and scope of the invention, which is best understood by the claims that follow.

What is claimed is:

1. In a system including an antenna array a method comprising:
   receiving an uplink signal generated at least in part by a source;
   calculating a current weight based at least in part on the uplink signal; and
   predicting a future weight as a function of the current weight and at least one previous weight.

2. The method of claim 1, wherein the at least one previous weight comprises a previous uplink weight.

3. The method of claim 2, wherein the current weight is a current uplink weight and the future weight is a future downlink weight, the method further comprising:
   predicting a future uplink weight based on the current weight and the at least one previous weight;
   wherein predicting the future weight based at least in part on the current weight and at least one previous weight comprises predicting the future downlink weight based at least in part on the current weight, the future uplink weight, and the at least one previous weight.

4. The method of claim 1, further comprising:
   an antenna array operating in accordance with a time division duplex (TDD) system.

5. The method of claim 1, further comprising:
   said antenna array operating in accordance with frequency division duplex (FDD).

6. The method of claim 1, further comprising:
   beamforming based at least in part on the predicted future weight.

7. The method of claim 3 wherein predicting the future weight based at least in part on the current weight, the future uplink weight, and the at least one previous weight comprises predicting the future weight as an interpolation of the current weight, the future uplink weight, and the at least one previous weight.

8. The method of claim 1, further comprising:
   determining an angle of arrival (AOA) of the uplink signal;
   wherein calculating the current weight based at least in part on the uplink signal comprises deriving the current weight based at least in part on the AOA of the uplink signal.

9. A method for downlink beamforming prediction said method comprising:
   receiving at an antenna array a signal transmitted by a communication device; =p1 deriving a current uplink weight for said signal; =p1 combining said current uplink weight with a set of previous uplink weights to obtain a sample of weights;
   predicting a future downlink, weight as a function of the sample of weights.

10. The method of claim 9, wherein combining said current uplink weight with said set of previous uplink weights to obtain said sample of weights comprises:
    multiplying said current uplink weight and said set of previous uplink weights by a set of linear prediction coefficients that reduce prediction error.

11. The method of claim 10, further comprising:
    recursively determining said set of linear prediction coefficients.

12. The method of claim 10, further comprising:
    determining said set of coefficients for a block of weight samples in said set of previous uplink weights.

13. The method of claim 9, wherein predicting said future downlink weight comprises:
    interpolating said current uplink weight and a predicted future uplink weight to derive said future downlink weight.

14. The method of claim 9, wherein said antenna array operates in a time division duplex (TDD) wireless communication system.

15. An apparatus comprising:
    an antenna array to receive uplink signals;
    an uplink signal transform unit, coupled to said antenna array to derive an uplink weight from said uplink signals;
    a storage area to store a set of previous uplink weights; and
    a predictor, coupled to the uplink transform unit and to the storage area, to predict a future downlink weight as a function of said uplink weight and said set of previous uplink weights.

16. The apparatus of claim 15, wherein said antenna array is part of a cellular basestation capable of spatial division multiple access (SDMA).

17. In an antenna array system, a method for predicting a future beamforming strategy, said method comprising:

generating a plurality of weights, wherein each weight corresponds to an instance of beamforming;

recursively determining a time variance of said plurality of weights;

predicting a future weight based on interpolating said time variance of said plurality of weights.

18. A machine-readable medium having stored thereon a set of machine-executable instructions that, when executed by a machine, cause said machine to perform the method comprising:

storing a plurality of previous weights, wherein each of said plurality of previous weights is determined from a corresponding set of previous uplink signals;

calculating a current weight based on a current set of uplink signals;

predicting a future weight based on interpolating said plurality of previous weights and said current weight.

19. The machine-readable medium of claim 18, wherein said plurality of previous weights comprises a set of previous downlink weights.

20. The machine-readable medium of claim 18, wherein said plurality of previous weights comprises a set of previous uplink weights.

21. The machine-readable medium of claim 18, wherein said current weight is a current uplink weight.

\* \* \* \* \*

UNITED STATES PATENT AND TRADEMARK OFFICE
CERTIFICATE OF CORRECTION

PATENT NO. : 6,441,784 B1
DATED : August 27, 2002
INVENTOR(S) : Flore et al.

It is certified that error appears in the above-identified patent and that said Letters Patent is hereby corrected as shown below:

Column 5,
Line 47, delete "AL" and insert -- $A_L$ --

Column 6,
Line 4, delete " $\hat{R}_K{}^{-1}$ " and insert -- $(\hat{R}_L)_K^{-1 \wedge W}$ --

Column 8,
Lines 29 and 30, delete "=p1"

Signed and Sealed this

Eighteenth Day of March, 2003

JAMES E. ROGAN
*Director of the United States Patent and Trademark Office*